United States Patent

Fuhrer et al.

[11] 4,098,030
[45] Jul. 4, 1978

[54] METHOD FOR FORMING A NARROWED-ELECTRODE PICKUP STYLUS FOR VIDEO DISC SYSTEMS

[75] Inventors: Jack Selig Fuhrer, Princeton Junction; Eugene Orville Keizer, Princeton, both of N.J.

[73] Assignee: RCA Corporation, New York, N.Y.

[21] Appl. No.: 782,019

[22] Filed: Mar. 28, 1977

[51] Int. Cl.² .............................................. B24B 1/00
[52] U.S. Cl. .................................. 51/281 R; 274/38; 360/122
[58] Field of Search ................. 51/5 R, 160, 162, 204, 51/206 R, 209 R, 209 S, 210, 281 R, 284 E, 326; 179/100.41 J, 100.4 M; 274/38; 360/122

[56] References Cited

U.S. PATENT DOCUMENTS

| | | | |
|---|---|---|---|
| 1,197,141 | 9/1916 | Mergenthaler | 51/5 R |
| 1,817,094 | 8/1931 | Moore | 274/38 |
| 2,350,732 | 4/1975 | Dickopp | 51/209 R |
| 3,826,877 | 7/1974 | Leedom | 274/38 |
| 3,842,194 | 10/1974 | Clemens | 274/38 X |
| 3,877,705 | 4/1975 | Joschko | 274/38 |
| 4,031,546 | 6/1977 | Leedom | 274/38 |

*Primary Examiner*—Gary L. Smith
*Attorney, Agent, or Firm*—Eugene M. Whitacre; Joseph S. Tripoli; Dilip A. Kulkarni

[57] ABSTRACT

A novel pickup stylus includes a tapering dielectric support element which has a tip defined by a prow and a relatively flat surface remote from the prow. The dielectric support element has an arrowhead-shaped cross-section in the region of its tip with the apex of the arrowhead-shape cross-section located on the prow and its base defined by the rear surface. The entire rear surface of the dielectric support element is covered with conductive material to form a narrow electrode in the region of its tip. To form a narrowed-electrode stylus, a tapering dielectric support element, having a prow and an electrode surface remote from the prow, is introduced in a trapezoidal abrasive groove while relative motion is established therebetween. The electrode face of the support element is gradually tilted toward the abrasive groove until it subtends a shallow angle therewith to form a portion having an arrowhead-shape cross-section in the region of its tip. The support element is lapped later to form a bottom surface defining a stylus shoe.

3 Claims, 17 Drawing Figures

METHOD FOR FORMING A NARROWED-ELECTRODE PICKUP STYLUS FOR VIDEO DISC SYSTEMS

The present invention relates to a novel disc record playback system of a form suitable for playback of high density information records such as video discs, and to a method for forming a novel stylus structure advantageous for use in such playback systems.

BACKGROUND OF THE INVENTION

In U.S. Pat. No. 3,842,194 issued on Oct. 15, 1974 to Jon K. Clemens, a video playback system of a variable capacitance form is disclosed. In one configuration of the Clemens system, information, representative of recorded picture and sound, is encoded in a relatively fine spiral groove on the surface of a disc record (e.g., groove width 3.5 micrometers, groove depth — 1.0 micrometers). The record substrate is covered with a coating of conductive material and a dielectric layer overlying the conductive coating. During playback, a pickup stylus, having a thin conductive electrode (e.g., about 0.2 micrometers thick), engages the groove as the record is rotated by a supportive turntable. Capacitive variations between the stylus electrode and the conductive coating are sensed to recover the prerecorded information.

In the systems of the above type, the use of a relatively fine record groove and the groove-engaging requirement for the pickup stylus result in a stylus tip which is extremely small.

Typically, the stylus tip is defined by a prow, a substantially flat, V-shaped rear surface remote from the prow, a bottom surface extending from the bottom edge of the rear surface and a pair of side surfaces extending from the side edges of the rear surface and converging at the prow. The intersection of the rear and the side surfaces with the bottom surface forms, for example, a triangular footprint. The entire rear surface is covered with conductive material to form a V-shaped electrode. Illustratively, the angle included between the two side edges is equal to 42°, the length of the bottom edge is about 2 micrometers, the height of the triangular footprint is about 4 micrometers, the angle between the prow and the rear surface is about 40°, and the electrode depth is about 0.2 micrometers.

In the previously mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion (FIG. 1); and (2) an "asymmetrical" structure, wherein the stylus electrode comprises a conductive coating on the rear surface of a dielectric support (FIG. 5).

The asymmetrical stylus form has proven to be convenient for ease in stylus fabrication, in that the entire rear surface is coated with conductive material. However, the stylus electrode, being V-shaped, gets wider as the stylus structure wears away. As the stylus electrode gets wider, the spurious capacitance between the electrode and the conductive coating in the adjacent grooves becomes significant, introducing noise in the recovered signal. When the stylus electrode becomes wider than the groove width (e.g., 3.5 micrometers), it is desirable to replace the stylus.

Although the sandwich form of the stylus structure overcomes the problem of increasing cross-talk with the increase in the width of the stylus electrode, it is difficult to fabricate. In particular, it is difficult to achieve a good registration (i.e., position, attitude, etc.) between the stylus electrode and the stylus tip.

In the copending application, Ser. No. 782,020 of the applicants herein, entitled "NARROW-ELECTRODE PICKUP STYLUS FOR VIDEO DISC SYSTEM", filed concurrently herewith, a novel narrowed-electrode pickup stylus, which overcomes the above-mentioned problems, and yet, which is relatively easy to fabricate, is disclosed.

The narrowed-electrode pickup stylus is suitable for playing back prerecorded signals from a disc record groove of a given width. The pickup stylus comprises a dielectric support element which converges toward a tip. The dielectric support element has an arrowhead-shaped cross-section in the region of its tip. The arrowhead-shaped cross-section is defined by a prow, a substantially flat rear surface remote from the prow having substantially parallel edges, a pair of side surfaces converging toward the prow, a pair of additional side surfaces extending from the parallel edges of the rear surface and proceeding toward the prow, and shoulder surfaces interconnecting the converging surfaces and the additional surfaces.

The maximum distance between the substantially parallel edges of the rear surface, in the region of the stylus tip, is less than the given groove width.

The entire rear surface is covered with conductive material between its substantially parallel edges to form a narrowed-electrode in the region of its tip.

SUMMARY OF THE INVENTION

Pursuant to this invention, to obtain a narrowed-electrode stylus, a V-shaped dielectric support element having a prow and a conductive coating on its substantially flat rear surface remote from the prow, is run on an abrasive lapping disc having a deep coarse-pitched groove. The electrode face of the support element is gently tilted toward the lapping disc until it subtends a substantially shallow angle relative to the lapping disc to obtain a portion which has an arrowhead-shape cross-section in the region of its tip.

The support element is lapped later to form a bottom surface which defines the stylus shoe.

DETAILED DESCRIPTION OF THE PREFERRED EMBODIMENT

Figure 1:
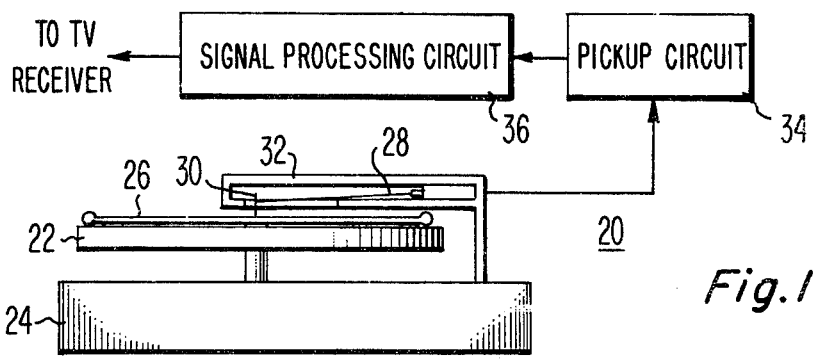
FIG. 1 illustrates a video disc system for playing back prerecorded signals recorded in a disc record groove of a given width in which a narrowed-electrode stylus constructed in accordance with the present invention may be advantageously employed.

Referring to FIG. 1, there is illustrated therein a video disc system 20 which is illustratively of a variable capacitance type as generally shown in the aforesaid Clemens patent. The system 20 includes a turntable 22 rotatably mounted on a base 24 for rotation at a proper playback speed (e.g., 450 rpm). The turntable 22 supports and centers a video disc 26 having information, representative of picture and sound, recorded along a spiral groove disposed on the surface thereof. To obtain an adequate playback time, the groove convolutions on the video disc 26 are relatively closely spaced (e.g., groove pitch - 3.5 micrometers). As stated previously, the video disc 26 has a dielectric deposit overlying a conductive coating on the video disc substrate.

A stylus arm 28, carrying a groove-engaging pickup stylus 30 at the free end thereof, is pivotally supported at its remote end to a carriage 32. The stylus arm pivot is, for example, of the type disclosed in U.S. Pat. No. 3,917,903 issued to B. K. Taylor, et al.

To enable the pickup stylus 30 to maintain a desired constant attitude in the video disc groove, the carriage 32 is traversed radially of the video disc 26 during playback at a speed suitably synchronized with the rotation of the video disc. The carriage traversing system is, for example, of the type shown in U.S. Pat. No. 3,870,835 issued to F. R. Stave.

As previously indicated, the pickup stylus 30 incorporates a relatively thin electrode (e.g., 0.2 micrometers deep). The capacitance variations between the stylus electrode and the video disc conductive coating are sensed during playback by a pickup circuit 34. The output of the pickup circuit 34 is processed by a signal processing circuit 36 to a form suitable to be used by a television receiver. The pickup circuit 34 is, for example, of the type illustrated in the copending U.S. Pat. appln. Ser. No. 743,144 of H. Kawamoto, et al. The signal processing circuit 36 is, for example, of the type illustrated in U.S. Pat. No. 3,969,757 issued to J. Amery.

Figure 2:
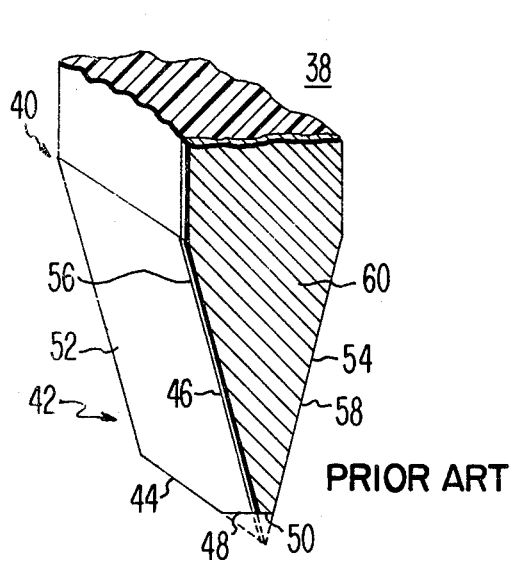
FIG. 2 illustrates an asymmetrical form of a prior art pickup stylus.

FIG. 2 shows an asymmetrical prior art pickup stylus having a V-shaped tip. The asymmetrical stylus 38 includes a dielectric support element 40 which has a V-shaped tip 42. The terminal portion of the V-shaped tip 42 is defined by a prow 44, a substantially flat rear surface 46 remote from the prow, a bottom surface 48 extending from the bottom edge 50 of the rear surface and a pair of side surfaces 52 and 54 extending, respectfully, from the side edges 56 and 58 of the rear surface and intersecting at the prow. The intersection of the rear surface 46 and the side surfaces 52 and 54 with the bottom surface 48 defines for example, a triangular stylus footprint. The entire rear surface 46 of the stylus support element 40 is coated with conductive material to form an electrode 60.

Figure 3:
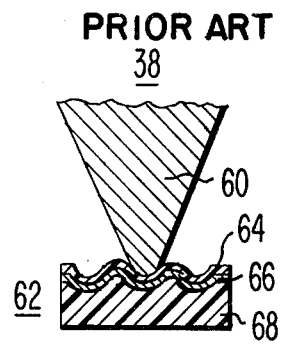
FIGS. 3 and 4 depict successive steps in the life of the asymmetrical stylus of FIG. 2, the asymmetrical stylus being shown riding in a disc record groove.
Figure 4:
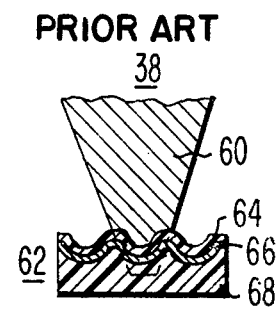

FIGS. 3 and 4 show successive stages in the life of the asymmetrical stylus 38 riding in a groove disposed on the surface of a video disc 62 having a dielectric deposit 64 overlying a conductive coating 66 on the video disc substrate 68.

As the asymmetrical stylus 38 wears to a shape shown in FIG. 4, the width of the stylus electrode 60 becomes the same as the distance between the adjacent grooves (e.g., 3.5 micrometers). When the stylus electrode 60 becomes wider, the cross-talk in the signal pickup output increases and it becomes desirable to replace the pickup stylus.

Figure 5:
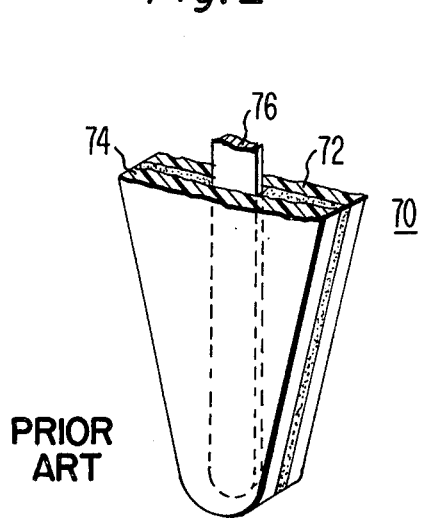
FIG. 5 shows a sandwich form of a pickup stylus structure.

FIG. 5 shows a sandwich form of a pickup stylus structure 70. As shown therein, the sandwich stylus includes a first and second dielectric support members 72 and 74 in which a narrow conductive electrode 76 is embedded.

As previously indicated, although the sandwich stylus is advantageous in that the stylus electrode does not get wider as the stylus wears away, it is difficult to achieve an accurate registration between the stylus electrode and the stylus tip due to the smallness of the dimensions involved.

Figure 6:
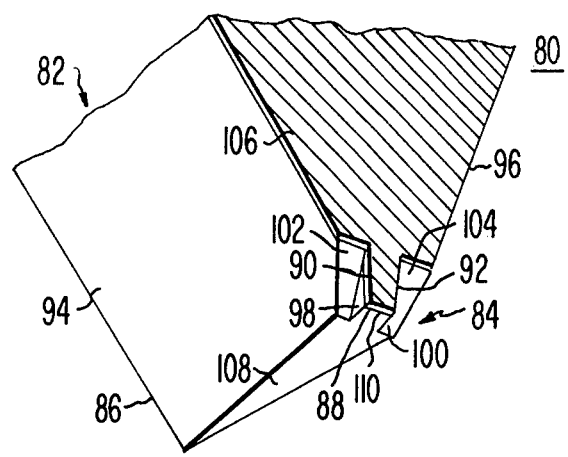
FIG. 6 illustrates a perspective view of a narrowed-electrode pickup stylus structure, in accordance with the principles of the present invention, suitable for use in the system of FIG. 1.
Figure 7:
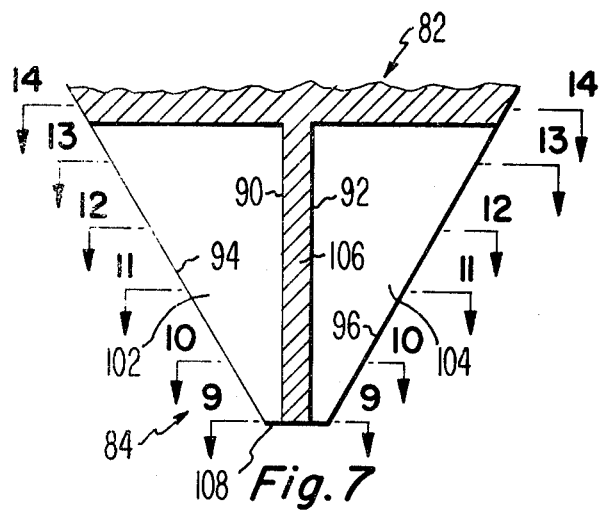
FIGS. 7 and 8 are respectively the front view and the side view of the narrowed-electrode pickup stylus of FIG. 6.
Figure 8:
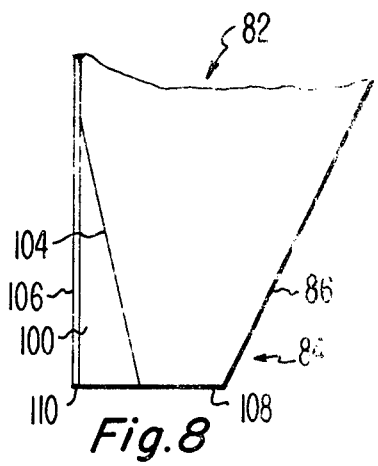
Figure 9:
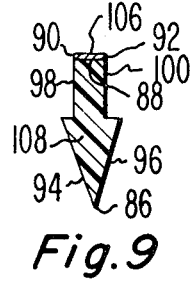
FIGS. 9-14 are cross-sections of the narrowed-electrode pickup stylus of FIGS. 6-8 taken along lines 9—9 to 14—14, respectively, in FIG. 7.

A novel narrowed-electrode pickup stylus 80 having an arrowhead cross-section in the region of its tip overcomes these problems. FIG. 6 is the perspective view of the narrowed-electrode stylus 80. FIGS. 7 and 8 illustrate, respectively, the front view and the side view of the narrowed-electrode stylus 80. FIGS. 9-14 show successive cross-sections of the narrowed-electrode stylus.

As shown in the respective drawings, the narrowed-electrode stylus 80 includes a dielectric support element 82 which tapers toward a tip 84. The dielectric support element 82 has an arrowhead cross-section in the region of its tip 84.

The arrowhead-shape cross-section is defined by a prow 86, a substantially flat rear surface 88 remote from the prow having substantially parallel edges 90 and 92, a pair of side surfaces 94 and 96 converging toward the prow, a pair of additional side surfaces 98 and 100 extending substantially orthogonally from the edges of the rear surfaces and proceeding toward the prow, and shoulder surfaces 102 and 104 joining the orthogonal surfaces with the converging surfaces.

The entire rear surface of the dielectric support element 82 is coated with conductive material to form a narrowed-electrode 106.

The dielectric support element 82 further has a bottom surface 108 extending from the bottom edge 110 of the substantially flat rear surface 88. The intersection of the rear, the orthogonal, the shoulder and the converging surfaces with the bottom surface 108 defines a stylus footprint. In this particular embodiment, the stylus footprint has an arrowhead-shape.

It can be seen from FIGS. 9-13 that the stylus electrode 106 does not get wider as the stylus wears away. Therefore, the signal-to-noise ratio obtained by using the arrow-head stylus is fairly constant throughout its useful life.

Additionally, it can be seen that the stylus life is appreciably extended since a greater volume of the stylus structure has to wear away before the stylus becomes unusable. An additional reason for the increase in stylus life is the fact that the stylus electrode is located in a relatively protected area during playback.

Illustratively, the configuration of the narrowed-electrode stylus 80 is as follows: the angle between the bevelled surfaces 94 and 96—42°, the length of the bottom edges 110 of the narrowhead shape footprint—3 micrometers, the longitudinal dimension of the arrowhead shape footprint—8 micrometers, the length of each of the shoulders of the arrowhead shape footprint—1 micrometer, the longitudinal dimension of the base of the arrowhead shape footprint —2 micrometers, the height of the narrowed-electrode in the region of stylus tip—5 micrometers, the electrode depth—0.2 micrometers, and the angle between the prow and the bottom surface 108 of the stylus —145°.

With this configuration, the life of the narrow-electrode stylus is about twice the life of the previously mentioned V-tipped stylus and the increment in the signal-to-noise ratio is of the order of 3dB (average).

The narrowed-electrode stylus not only offers advantages in performance and stylus life, but it also is relatively easy to fabricate by modifying a V-tipped stylus to obtain a narrowed-electrode stylus.

Figure 15:
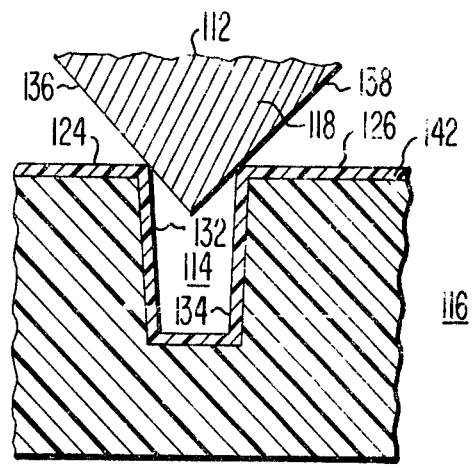
FIGS. 15 and 16 illustrate a portion of lapping disc suitable for forming the narrowed-electrode pickup stylus of FIGS. 6-8.
Figure 16:
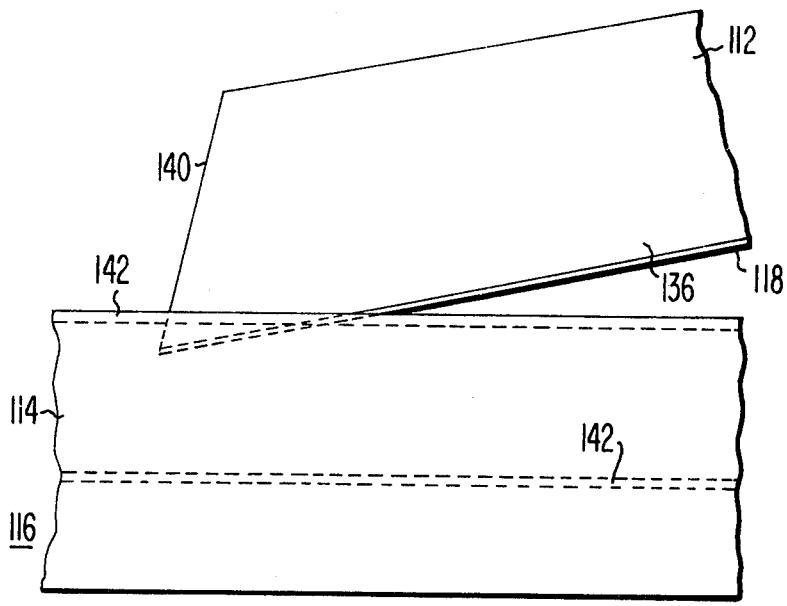

The narrowed-electrode stylus 80 is formed by introducing a V-tipped stylus 112 into an abrasive groove 114 of a lapping disc 116 with its electrode 118 disposed substantially orthogonally to the lapping disc, as shown in FIG. 15, while an appropriate stylus/disc relative motion is established. After allowing the stylus 112 to register itself with respect to the groove 114, the electrode face of the stylus is gently tilted toward the lapping disc 116 until the electrode 118 makes a substantially shallow angle relative to the lapping disc (e.g., 5°) as shown in FIG. 16. The stylus 112 is run in the tilted position for a time interval appropriate for the dimensions desired (e.g., 5-20 seconds where the dielectric support element is sapphire and the lapping disc has $SiO_2$ coating).

Figure 17:
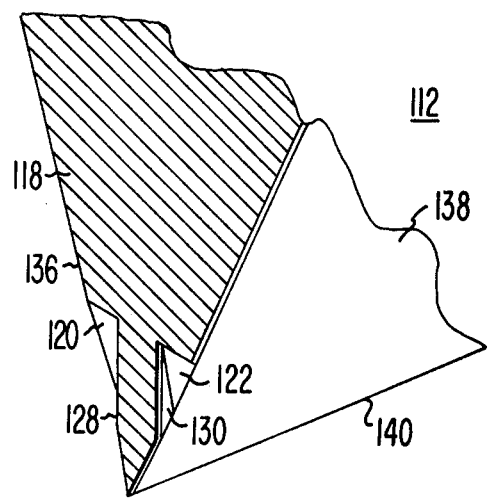
FIG. 17 shows the narrowed-electrode pickup stylus of FIGS. 6-8 before stylus shoe lapping.

FIG. 17 shows the way the stylus 112 looks after it is run in the lapping disc 116 in the tilted position for the specified time interval. As shown therein, the shoulder surfaces 120 and 122 are lapped by the lands 124 and 126 of the lapping disc 116 and the substantially orthogonal surfaces 128 and 130 are lapped by the walls 132 and 134 of the abrasive groove 114. The bevelled surfaces 136 and 138 of the stylus 112 intersect with each other to define a prow 140.

The bottom of the stylus 112 shown in FIG. 17 is shoe-lapped to form a substantially flat bottom surface. After shoe-lapping, the stylus will be of the form shown in FIGS. 6–8.

The narrowed-electrode stylus fabricated in this fashion provides a very precise registration between the narrowed-electrode and the stylus tip.

While in this particular embodiment, the abrasive groove 114 has a trapezoidal cross-section, as shown in FIG. 15, to obtain substantially orthogonal surfaces 128 and 130, the abrasive groove may be made to have a V-shaped cross-section to obtain flared surfaces interconnecting the shoulder surfaces 120 and 122 with the rear surface of the stylus support element.

The width of the abrasive groove 114 is determined by the desired width for the narrowed electrode (e.g., 3 micrometers).

The lapping disc 116 shown in FIG. 15 has lands 124 and 126 which extend substantially orthogonally from the walls 122 and 124 of the abrasive groove 114 to obtain shoulder surfaces 120 and 122 as shown in FIG. 17. However, the lands 124 and 126 may be flared so as to obtain flared shoulder surfaces interconnecting the orthogonal surfaces with the converging surfaces of the stylus.

The V-tipped stylus 122 may be held in orthogonal position shown in FIG. 15 for a given time interval to obtain a keel tip of the type shown in the U.S. Pat. Application, Ser. No. 781,302 of E. O. Keizer, filed on Mar. 25, 1977, and entitled "METHOD FOR FORMING KEEL-TIPPED STYLUS FOR VIDEO DISC SYSTEMS". Subsequent to the formation of the keel tip, the electrode face of the stylus 112 can be gently tilted toward the lapping disc until it subtends an acute angle relative to the lapping disc 116. The stylus 112 may be held in the tilted position shown in FIG. 16 for a specified time interval to form a section having an arrowhead-shaped cross-section above the keel tip. The stylus made in this fashion will have a pentagonal footprint until the keel tip is worn away, and then it will have an arrowhead shape footprint.

Figure 12:
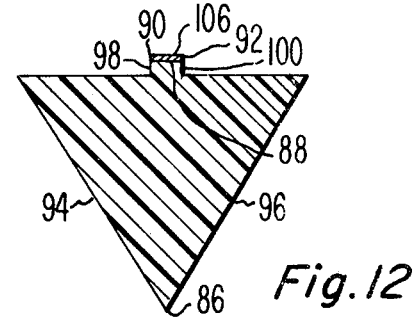
Figure 10:
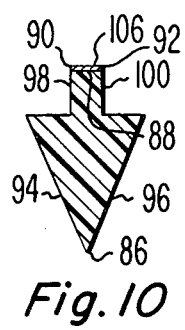
Figure 13:
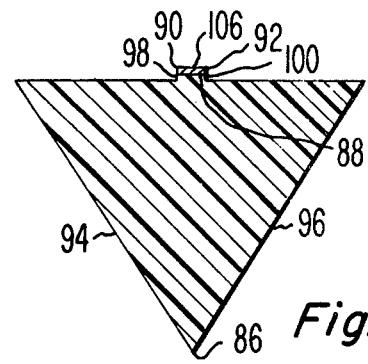
Figure 11:
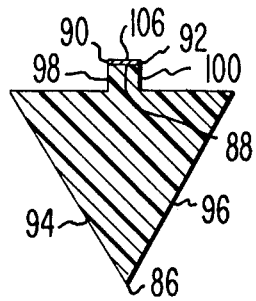
Figure 14:
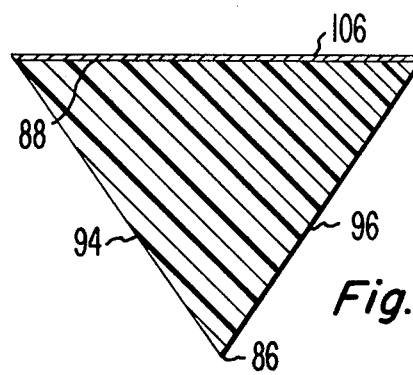

The manufacture of the lapping disc 116 will now be described. A fairly flat and smooth copper clad substrate is coated with a thick coating (e.g., several micrometers) of photoresist. The photoresist coated substrate is exposed with an intense beam of energy (e.g., electron beam or light) of the desired width (e.g., 3.0 micrometers) along a spiral track of a coarse pitch. After developing the exposed photoresist coated substrate, the exposed photoresist region is removed to form a coarse spiral groove on the substrate. A metal stamper is obtained therefrom by a process such as electroless plating. The metal stamper is used to press plastic discs. The plastic discs may be made from the same material as video discs. An abrasive material, such as $SiO_2$ is deposited thereon to form an abrasive layer 142 as shown in FIGS. 12 and 13.

Narrowed-electrode styli, in accordance with the embodiments of the present invention, have been successfully made from diamond, as well as from sapphire, support elements.

We claim:

1. A method of fabricating a narrowed-electrode stylus by modifying a tapering dielectric support element having a tip which is defined by a prow and a substantially flat V-shaped rear surface remote from said prow; the entire rear surface of said dielectric support element being covered with conductive material to form an electrode; said narrowed-electrode stylus being suitable for playing back prerecorded signals from a disc record groove of a given width and a given pitch; said method comprising the steps of:

introducing said tip of said tapering support element in an abrasive groove having a bottom wall, substantially parallel side walls separated by a distance less than said given width and lands extending away from said side walls; while establishing relative motion between said tapering support element and said abrasive groove along a line which is disposed in a plane substantially perpendicular to said V-shaped rear surface;

gently tilting said electrode face of said support element toward said abrasive groove until it subtends a shallow angle with the bottom wall of said abrasive groove to form a portion having an arrowhead-shape cross-section in the region of said tip;

the apex of said arrowhead-shape cross-section being located on said prow; the base of said arrowhead-shape cross-section being defined by said substantially flat rear surface;

said lands of said abrasive grooves forming the shoulders of said arrowhead-shape cross-section;

said side walls of said abrasive groove forming the sides of said arrowhead-shape cross-section interconnecting said shoulders and said base of said arrowhead-shape cross-section; and terminating said relative motion subsequent to formation of said tip portion having an arrowhead-shape cross-section.

2. A method as defined in claim 1 further including the step of lapping said tapering support element to form a bottom surface substantially perpendicular to said rear surface subsequent to termination of said relative motion to form a stylus shoe.

3. A method as defined in claim 1 wherein said abrasive groove forms a spiral groove on a lapping disc having a pitch coarser than said given pitch of said disc record.

* * * * *